(12) United States Patent
Tardieu et al.

(10) Patent No.: US 6,740,699 B2
(45) Date of Patent: May 25, 2004

(54) METHOD FOR OBTAINING A STABILIZED PHOTOCHROMIC LATEX, LATEX OBTAINED, AND APPLICATION TO OPHTHALMIC OPTICS

(75) Inventors: Pascale Tardieu, Paris (FR); Sylvette Maisonnier, Moisselles (FR); Anne Robert, Villecresne (FR); Jean-Paul Cano, Chennevieres sur Marne (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 10/044,608

(22) Filed: Jan. 11, 2002

(65) Prior Publication Data

US 2003/0100672 A1 May 29, 2003

(30) Foreign Application Priority Data

Jan. 11, 2001 (FR) .............................. 01 00343

(51) Int. Cl.$^7$ ............................ C08K 5/01; C08K 5/10; C08K 5/38; C08K 5/48
(52) U.S. Cl. .................... 524/481; 523/105; 523/106; 524/280; 524/282; 524/283; 524/287; 524/365; 524/380; 524/755; 524/765; 524/774
(58) Field of Search ................................ 523/105, 106; 524/280, 282, 283, 287, 365, 380, 481, 755, 765, 774

(56) References Cited

U.S. PATENT DOCUMENTS

| | | | |
|---|---|---|---|
| 3,567,605 A | 3/1971 | Becker ........................ 204/158 |
| 4,533,254 A | 8/1985 | Cook et al. .................. 366/176 |
| 5,066,818 A | 11/1991 | Gemert et al. .............. 549/389 |
| 5,114,621 A | 5/1992 | Guglielmetti et al. ....... 252/586 |
| 5,569,716 A | 10/1996 | Okamoto et al. ........... 525/192 |
| 5,645,767 A | 7/1997 | Van Gemert ................ 252/586 |
| 5,653,965 A | 8/1997 | Narayanan et al. ........... 424/59 |
| 5,656,206 A | 8/1997 | Knowles et al. ............. 252/586 |
| 5,702,825 A | 12/1997 | Keita et al. .................. 428/500 |
| 5,914,174 A | 6/1999 | Gupta et al. ................. 428/174 |

FOREIGN PATENT DOCUMENTS

| | | |
|---|---|---|
| EP | 0224123 | 6/1987 |
| EP | 0245020 | 11/1987 |
| EP | 0401958 | 12/1990 |
| EP | 0562915 | 9/1993 |
| EP | 0852239 | 7/1998 |
| FR | 2688782 | 9/1993 |
| FR | 2718447 | 10/1995 |
| FR | 2763070 | 11/1998 |
| FR | 2785904 | 5/2000 |
| FR | 2790264 | 9/2000 |
| JP | 3251587 | 11/1991 |
| WO | WO 89/05464 | 6/1989 |
| WO | WO 93/17071 | 9/1993 |
| WO | WO 94/20869 | 9/1994 |
| WO | WO 96/04590 | 2/1996 |
| WO | WO 98/50436 | 11/1998 |

OTHER PUBLICATIONS

Co–pending U.S. patent application Ser. No. 09/991,773 by Anne Robert et al., filed Nov. 16, 2001.

*Primary Examiner*—Kriellion A. Sanders
(74) *Attorney, Agent, or Firm*—Fulbright & Jaworski L.L.P.

(57) ABSTRACT

The invention relates to methods for obtaining the photochromic latex comprising the polymerization in aqueous emulsion of an initial polymerizable mixture, comprising one or more monomers polymerizable by free-radical mechanism and one or more photochromic compounds and the addition to the initial polymerizable mixture, during the polymerization of the initial polymerizable mixture or to the final latex of at least one agent for stabilizing the photochromic properties.

Such latexes can be used in the production of photochromic films. Such films may be used, for example, on optical lenses.

35 Claims, No Drawings

METHOD FOR OBTAINING A STABILIZED PHOTOCHROMIC LATEX, LATEX OBTAINED, AND APPLICATION TO OPHTHALMIC OPTICS

BACKGROUND OF THE INVENTION

The present application claims priority to French Application No. 01/00343 filed Jan. 11, 2001, the entire text of which is specifically incorporated by reference herein without disclaimer.

1. Field of the Invention

The invention in general concerns a method for obtaining a photochromic latex whose properties, in particular photochromic, remain stable over time, the thus stabilized photochromic latexes and their use in ophthalmic optics.

2. Description of Related Art

The preparation of photochromic latexes by polymerization of acrylic or methacrylic monomers comprising one or more photochromic compounds in aqueous emulsion is already known.

These photochromic latexes are conventionally obtained by preparing a first solution comprising the monomer(s), the photochromic compound(s) and a second solution comprising the dispersion medium, generally water and a surface-active agent, and mixing the two solutions with vigorous stirring to obtain a pre-emulsion. The pre-emulsion is then transferred in a single step into a reactor and degassed under nitrogen with stirring. After the degassing, a polymerization initiator, generally in solution in a solvent (typically water), is added and the polymerization is performed by heating to give the latex.

The latex obtained is then coarsely filtered through fabric and stored in the absence of light.

Such a method for obtaining a latex with photochromic properties is disclosed in the document FR 2.790.264.

The French patent application N° 00 14903 filed on Nov. 17, 2000 discloses the use of mini-emulsions for preparing photochromic latexes.

More particularly, according to this method, the preparation of a photochromic latex comprises preparing a mixture comprising at least one monomer with a C=C group polymerizable by free-radical mechanism, at least one organic photochromic compound, at least one surface-active agent, water and optionally a polymerization initiator, treating the mixture obtained to form a mini-emulsion comprising an organic phase dispersed in the form of droplets with a diameter of 50 to 500 nm, preferably 50 to 300 nm, in an aqueous phase, adding a polymerization initiator to the mini-emulsion, if this has not already been introduced, or an additional quantity of initiator compared to the quantity initially introduced, polymerizing the reaction mixture obtained and recovering the photochromic latex.

The initial mixture is preferably obtained by separately preparing a first solution comprising the monomer(s), the photochromic compound(s) and optionally the stabilization agent(s) and a second solution comprising water and the surface-active agent(s), then combining the two solutions.

The mini-emulsion is obtained for example by emulsification by means of a micro-fluidizer such as the micro-fluidizer disclosed in the U.S. Pat. No. 4,533,254.

The use of mini-emulsions for emulsion polymerization is also disclosed in the documents FR 2.785.904, EP 852.239, U.S. Pat. No. 5,569,716. U.S. Pat. No. 5,653,965 and WO 98/50436.

The latexes obtained by conventional methods and the method of polymerization in mini-emulsion, although giving satisfactory results when deposited and dried soon after their preparation, nevertheless have the disadvantage of losing a significant amount of their photochromic properties over time.

More exactly, analyses by high-pressure liquid-phase chromatography (HPLC) of photochromic latexes, whatever their method of preparation, conventional or by mini-emulsion, have shown a decrease in concentration of the photochromic compounds within the liquid latex as a function of time. This degradation is generally very rapid and can lead to a 50% decrease in photochromic compounds in the liquid latex in one month.

The problem of stabilizing photochromic compounds present in thin films of resins has already been tackled in the prior art, but mainly as regards stabilization against external degradations such as light, and in particular UV radiation.

Thus, the patent U.S. Pat. No. 5,914,174 discloses photochromic resins containing additives such as antioxidants, radical-trapping agents and UV absorbers. In particular, it is stated in this patent that the use of hindered amines and agents which remove species in the excited state improves performances against bad weather.

In the case of latexes, the technical problem is that of the degradation of photochromic compounds within liquid latexes, in other words before their application as a film, and even in the absence of any external factor likely to modify or degrade the properties of the photochromic compounds.

It is particularly significant to note that the degradation of photochromic latexes occurs even when they are stored in closed containers, in the absence of ambient air or light. This is thus a problem completely specific to latexes.

SUMMARY OF THE INVENTION

The object of the invention is thus a method for obtaining a photochromic latex whose properties, in particular photochromic, remain stable over time, in particular when the latex is stored in the absence of ambient air and of light.

A further object of the invention is a stabilized photochromic latex, whose photochromic properties remain stable over time, in particular when the latex is stored in the absence of ambient air and of light.

An additional object of the invention is substrates, in particular optical articles such as ophthalmic lenses, coated with dried films of the latexes such as those defined above.

The above objectives are achieved according to the invention by a method for obtaining photochromic latexes comprising a polymerization in aqueous emulsion of an initial polymerizable mixture comprising one or more organic monomers containing C=C groups which are polymerizable by free-radical mechanism and one or more photochromic compounds until a final latex is obtained, characterized in that it comprises the addition to the initial polymerizable mixture, during the polymerization of the initial polymerizable mixture or to the final latex of an effective quantity of at least one stabilization agent selected from compounds of cyclopentene, cyclohexene, cycloheptene, cyclooctene and compounds containing an ethylenic unsaturation not forming part of an aromatic ring and which contain, in the α position with respect to the ethylenic unsaturation, a carbon atom bearing a free hydroxy group.

The stabilization agent is preferably introduced into the initial polymerizable mixture.

In the present application, final latex should be understood to mean a latex whose concentration in the dry extract does not change over time. The final latex is generally obtained after about 1 hour of reaction.

The invention also concerns a stabilized photochromic latex comprising a dispersion in an aqueous phase of polymer particles resulting from the polymerization in aqueous phase of a mixture of one or more organic monomers containing C=C groups which are polymerizable by free-radical mechanism and one or more photochromic compounds and an effective quantity of at least one stabilization agent selected from compounds of cyclopentene, cyclohexene, cycloheptene, cyclooctene and compounds containing an ethylenic unsaturation not forming part of an aromatic ring and which contain, in the α position with respect to the ethylenic unsaturation, a carbon atom bearing a free hydroxy group.

The agents for stabilizing the photochromic properties according to the invention are compounds known as anti-yellowing agents in formulations based on bisphenol A dimethacrylates or bisphenol A diallyl carbonate. These agents are disclosed, amongst others, in U.S. Pat. No. 5,702,825 and EP 224.123.

More particularly, these stabilization agents are compounds of cyclopentene, cyclohexene, cycloheptene, cyclooctene and compounds containing an ethylenic unsaturation not forming part of an aromatic ring and which contain, in the α position with respect to the ethylenic unsaturation, a carbon atom bearing a free hydroxy group.

The preferred stabilization agents are the derivatives of cyclohexene.

A wide variety of cyclohexene compounds may be used as stabilization agents. The cyclohexene compounds may be represented by the formula:

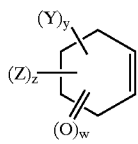

(I)

in which each Y is independently an alkyl group of 1 to 4 carbon atoms, Z is a hydroxy group, a 2-oxoethyl group, a hydroxyalkyl group of 1 to 3 carbon atoms, an alkoxycarbonyl group of 2 to 5 carbon atoms, or

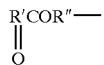

in which R' is an alkyl radical of 1 to 4 carbon atoms and R" is an alkane di-yl radical of 2 to 4 carbon atoms or an alkylidene radical of 1 to 5 carbon atoms, y is an integer from 0 to 3, z represents 0 or 1, w represents 0 or 1, and the sum of z and w is 0 or 1.

Y is preferably a methyl group. The groups represented by Y may be identical or different.

When Z is a hydroxyalkyl group, it is typically a hydroxymethyl, 2-hydroxyethyl, or 1-hydroxy-1-methylethyl group. When Z is an alkoxycarbonyl group, it typically contains 2 or 3 carbon atoms. The preferred group is a methoxycarbonyl group. R' is preferably a methyl, ethyl or propyl group. When R" is an alkane di-yl group, it may be linear or branched. The preferred group is a ethane di-yl group. When R" is an alkylidene group, it is conventionally a methylene group or a methyl ethylidene group. y is preferably equal to 0 or 1. z is similarly preferably equal to 0 or 1. Also preferably, w is equal to 0.

Examples of cyclohexene compounds which may be used in the invention include cyclohexene, α-terpineol, terpinen-4-ol, α-terpinyl acetate, α-terpinyl propionate, α-terpinyl butyrate, 1-methyl-1-cyclohexene, 3-methyl-1-cyclohexene, 4-methyl-1-cyclohexene, methyl 1-cyclohexene-1-carboxylate, 3-methyl-2-cyclohexen-1-ol, 3-methyl-2-cyclohexen-1-one, 4-isopropyl-2-cyclohexen-1-one, 3,5-dimethyl-2-cyclohexen-1-one, 4,4-dimethyl-2-cyclohexen-1-one, isophorone, 2,6,6-trimethyl-1-cyclohexene-1-acetaldehyde, and 3,5,5-trimethyl-2-cyclohexen-1-ol. The preferred cyclohexene derivatives are cyclohexene, α-terpinyl acetate, α-terpinyl propionate, α-terpinyl butyrate, and most particularly cyclohexene, α-terpinyl acetate or a mixture of these.

The compounds with ethylenic unsaturation which are suitable for the invention contain, as stated above, an ethylenic unsaturation not forming part of an aromatic ring and containing in the α position with respect to the ethylenic unsaturation a carbon atom bearing a hydroxy group and bonded to at least one hydrogen atom.

These compounds with ethylenic unsaturation are preferably selected from the compounds of formula:

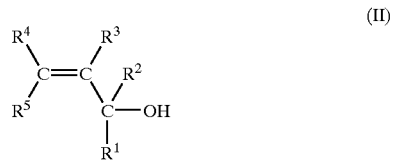

(II)

in which $R^1$, $R^2$ represent hydrogen or one of the $R^1$ and $R^2$ groups represents hydrogen, while the other forms, with the $R^5$ group, a $C_5$–$C_{10}$ ring which may be substituted with one or more linear or branched $C_1$–$C_4$ alkyl groups or one or more $C_2$–$C_4$ alkylene groups; or one of the $R^1$, $R^2$ groups may represent hydrogen, while the other represents a $C_1$–$C_6$ aliphatic alkyl group, a $C_4$–$C_{16}$ cyclic hydrocarbon group or a $C_6$–$C_{16}$ aromatic hydrocarbon group.

$R^3$, $R^4$ and $R^5$ independently represent hydrogen or a $C_1$–$C_6$ alkyl group which may be substituted with one or more OH groups and in which the chain may be interrupted by one or more ether, ester or ketone groups; a $C_6$–$C_{16}$ aromatic hydrocarbon group or a $C_4$–$C_{16}$ cyclic hydrocarbon group; $R^5$ may form, with one of the $R^1$ or $R^2$ groups, a $C_5$–$C_{10}$ ring which may be substituted with one or more linear or branched $C_1$–$C_4$ alkyl groups or one or more $C_2$–$C_4$ alkylene groups;

$R^3$ and $R^4$ may form a $C_5$–$C_{10}$ ring which may be substituted with one or more $C_1$–$C_4$ alkyl groups or $C_2$–$C_4$ alkylene groups;

Two or more carbon atoms of the $C_5$–$C_{10}$ ring formed with $R^1$ or $R^2$ and $R^5$ or with $R^3$ and $R^4$ may be bonded by a hydrocarbon bridge.

According to the invention, the $C_1$–$C_6$ alkyl group is preferably a methyl or ethyl group.

Preferably $R^1$ and $R^2$ represent hydrogen, $R^3$ represents a methyl group, $R^4$ represents hydrogen or a methyl group and $R^5$ represents hydrogen, a methyl, ethyl or $CH_2OH$ group.

The preferred compounds with ethylenic unsaturation of formula (II) are allyl alcohol, methallyl alcohol, crotyl alcohol, 2-cyclohexen-1-ol, trans-2-hexen-1-ol, cis-2-butene-1,4-diol, 3-methyl-2-buten-1-ol, trans-2-methyl-3-phenyl-2-propan-1-ol, 3-buten-2-ol, carveol, myrtenol, verbenol and trans-cinnamyl alcohol.

The preferred compound with ethylenic unsaturation is 3-methyl-2-buten-1-ol (MBOL).

As stated above, the stabilization agent or agents for photochromic properties may be introduced at any time during the latex preparation, and in particular into the initial monomer mixture or the final latex, in other words at the end of the latex synthesis, when the dry extract obtained is stable and no longer changes over the course of time. This end of synthesis generally occurs after 1 hour of reaction.

However, the introduction of the stabilization agent or agents for photochromic properties is preferably performed into the initial polymerizable mixture.

The quantity of stabilization agent introduced may vary over a wide range, but must be at least sufficient to obtain a significant stabilization of the photochromic properties of the final latex.

The quantity of stabilization agent or agents introduced generally represents 0.1 to 10% by weight, preferably 1 to 10% by weight and more preferably about 5% by weight compared to the weight of monomers in the initial mixture.

The monomers polymerizable by free-radical mechanism suitable for the present invention may be aromatic or non-aromatic.

The recommended monomers are monomers of the alkyl (meth)acrylate type, preferably of the mono(meth)acrylate type.

The alkyl groups are preferably $C_1$–$C_{10}$ alkyl groups, such as methyl, ethyl, propyl and butyl.

The preferred monomers include the methyl, ethyl, propyl, butyl, and isobutyl acrylates and methacrylates and also the bifunctional derivatives such as butanediol di(meth) acrylate or trifunctional such as trimethylol propane tri (meth)acrylate.

The preferred aromatic monomers include monofunctional aromatic compounds such as phenyl (meth)acrylate, benzyl (meth)acrylate, phenoxyethyl (meth)acrylate and styrene.

Mixtures of these monomers may also be used, in particular mixtures of $C_2$–$C_{10}$ alkyl monomers and $C_1$–$C_3$ alkyl methacrylates.

The organic photochromic compounds suitable for the present invention are all organic compounds showing photochromic properties. These compounds are well known in the state of the art.

The preferred compounds are the chromenes and spirooxazines.

The chromenes are described, amongst others, in the documents U.S. Pat. No. 3,567,605, U.S. Pat. No. 5,066,818, U.S. Pat. No. 5,645,767, U.S. Pat. No. 5,656,206, WO 93/17071, WO 94/20869, FR 2.688.782, FR 2.718.447, EP 0.401.958, and EP 0.562.915.

The spirooxazines are also well known photochromic compounds. Such compounds are described, amongst others, in the patents U.S. Pat. No. 5,114,621, EP 0.245.020, JP A 03251587, WO 96/04590 and FR 2.763.070.

The photochromic compound is introduced in sufficient quantity to obtain the desired photochromic effect in the final latex films.

The concentrations in photochromic compounds generally vary from 1 to 10%, preferably from 2 to 7% by weight compared to the weight of polymerizable monomers present in the latex.

To improve the solubilization of the photochromic compound, a small quantity of a solvent of the photochromic compound may optionally be added to the mixture, for example N-methylpyrrolidone in the case of the chromenes. The quantity of solvent added may be up to 20% by weight (depending on the solubility of the compound) compared to the weight of polymerizable monomers present in the initial mixture.

As is also conventional, the initial polymerizable mixture may contain a surface-active agent. The surface-active agent may be ionic, non-ionic or amphoteric. The ionic surface-active agents include sodium dodecyl sulfate, sodium dodecyl benzenesulfonate, sodium sulfonate, the sulfates of ethoxylated fatty alcohols and cetyltrimethylammonium bromide (CTAB), azobiscyanopentanoic acid (dissolved and neutralized).

The non-ionic surface-active agents include the ethoxylated fatty alcohols.

A mixture of surface-active agents may obviously be used in the initial polymerization mixture.

The initial polymerization mixture also contains a polymerization initiator.

The polymerization initiator may be any conventionally used initiator. It may be soluble in water or the organic phase.

The water-soluble initiators used for the polymerization of the compositions according to the invention are salts and compounds having at least one hydrophilic function.

These salts and compounds include the alkali metal and ammonium persulfates, in particular sodium and potassium persulfate, hydrogen peroxide, 2,2'-azobis(2-amidinopropane) dihydrochloride.

Partially water-soluble peroxides such as succinic peracid and t-butyl hydroperoxide may also be used.

Redox systems such as the persulfates combined with a ferrous ion may also be used.

Cumyl hydroperoxide or hydrogen peroxide, in the presence of ferrous, sulfite or bisulfite ions may also be used.

The initiators soluble in the organic phase include azobisisobutyronitrile (AIBN). The initiator may be added to the initial polymerizable mixture in a single step, but it is also possible to add it semi-continuously during the polymerization reaction.

The aqueous phase of the latex may contain water only or it may contain a mixture of water and an appropriate solvent, for example to aid film formation. The aqueous phase may also contain a buffer, for example $NaHCO_3$. When a solvent is present, it may generally represent up to 10% by weight of the aqueous phase, preferably less than 5% by weight and more preferably mess than 2% by weight.

The aqueous phase preferably contains water only.

As stated above, the emulsion polymerization of the initial polymerizable mixture of monomers may be performed by conventional means or by the technique called "mini-emulsion".

When the mini-emulsion technique is used, an agent for stabilizing the mini-emulsion may also be added to the initial polymerizable mixture.

This stabilization agent of a mini-emulsion may be an alkane, a halogenated alkane or a monomer, polymerizable or not, containing a fatty chain such as a fatty alcohol or a fatty alcohol ester.

The preferred stabilization agents are hexadecane, cetyl alcohol and stearyl methacrylate.

The particularly preferred stabilization agent is stearyl methacrylate since it is integrated into the network, because of the presence of the methacrylate function.

The concentration of stabilization agents in the mixture generally varies from 0.1 to 10%, preferably from 2 to 6% by weight compared to the weight of polymerizable monomers present in the initial mixture.

The deposition of the latexes according to the invention on the substrates may be performed by any conventional method centrifugation, spraying or by combining both methods.

DESCRIPTION OF ILLUSTRATIVE EMBODIMENTS

In the following examples, except where otherwise stated, all percentages and parts are by weight.

EXAMPLES 1 TO 5 AND COMPARATIVE EXAMPLE A

Agents of the methyl-2-buten-1-one and cyclohexene type were introduced into the formulations (5% by weight compared to the total weight of monomer in the initial mixture).

The compositions of the initial polymerizable mixtures used are given in table I below:

TABLE I

| Composition of the initial polymerizable mixture | | | | | | | |
|---|---|---|---|---|---|---|---|
| N° | M1 | M2 | M3 | M4 | M5 | M6 | M7 |
| Polymerizable monomer Butyl methacrylate (g) | 46.4 | 46.4 | 46.4 | 46.4 | 46.4 | 46.4 | 46.4 |
| Photochromic compound | | | | | | | |
| Spiro A* (g) | 3.25 | 3.25 | 3.25 | 3.25 | 3.25 | — | — |
| PC1** (g) | — | — | — | — | — | 3.25 | — |
| Spiro B*** (g) | — | — | — | — | — | — | 3.25 |
| Photochromic property stabilization agent | — | 2.32 | — | 2.32 | — | — | — |
| MBOL(g) | — | — | — | — | 2.32 | 2.32 | — |
| Cyclohexene (g) | — | — | — | — | — | — | 2.32 |
| Terpinyl acetate | | | | | | | |
| Mini-emulsion stabilization agent**** Stearyl methacrylate (g) | 2.32 | — | — | 2.32 | 2.32 | 2.32 | 2.32 |
| Suface-active agent CTAB (g) | 1.5 | 1.5 | 1.5 | 1.5 | 1.5 | 1.5 | 1.5 |
| Initiator***** 2,2'-azobis(2-amidinopropane) 2HCl (g) | 0.48 | 0.48 | 0.48 | 0.48 | 0.48 | 0.48 | 0.48 |
| Water | 73 | 73 | 73 | 73 | 73 | 73 | 73 |

*Spiro A

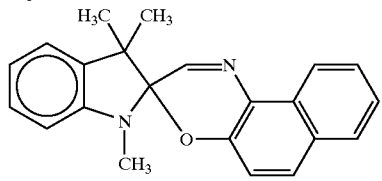

**PC1 Mixture of 2-naphthopyrans according to U.S. Pat. Nos. 5,645,767 and 5,656,206.

***Spiro B

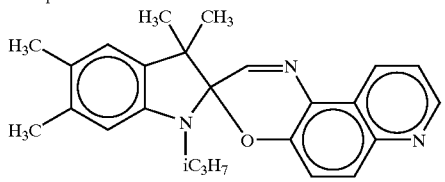

****Not used in the conventional method. Only used for the mini-emulsion.
*****Solution of 0.48 g, diluted in 4.8 g of water.

The latexes were prepared either by a conventional emulsion polymerization method, or by a mini-emulsion polymerization method.

The initial mixtures were prepared by combining a solution A containing the polymerizable monomer, optionally the photochromic property stabilization agent and the mini-emulsion stabilization agent and the photochromic compound and a solution B containing the surface-active agent and water.

The conventional emulsions were obtained by simple mechanical stirring of the mixtures.

To obtain the mini-emulsions, the mixtures were treated in a single batch in a micro-fluidizer from STANSTED FLUID POWER LTD, model nm-CEN 7400H at a pressure of 70 MPa.

The conventional emulsions and mini-emulsions were then transferred into a reactor and subjected to degassing under nitrogen for 30 minutes at 60° C., with stirring at 250 r.p.m.

A solution of an initiator was then prepared by dissolving 0.48 g of 2,2'-azobis(2-amidinopropane) dihydrochloride in 4.8 g of water, and this solution was added in a single step into the reactor containing 103 g of emulsion or mini-emulsion to initiate the polymerization reaction.

The polymerization was performed at a temperature of 60° C.

At the end of the polymerization, the heating was stopped and the mixture left to cool to ambient temperature (23° C.), and optionally the appropriate quantity of photochromic property stabilization agent was added when this had not been added in the initial polymerizable mixture.

The conditions of preparation of the latexes of the comparative examples A and 1 to 5 are given in Table II below:

TABLE II

| Example N° | Initial mixture | Emulsion type | Addition of photochromic property stabilization agent to the final latex | |
|---|---|---|---|---|
| | | | MBOL (g) | Cyclohexene (g) |
| Comparative A | M1 | Mini-emulsion | — | — |
| 1 | M2 | Conventional | — | — |
| 2 | M3 | Conventional | 2.32 | — |
| 3 | M4 | Mini-emulsion | — | — |
| 4 | M5 | Mini-emulsion | — | — |
| 5 | M6 | Mini-emulsion | — | — |
| 6 | M7 | Mini-emulsion | — | — |

The variation of the latexes obtained was monitored by HPLC determination of the photochromic colorant.

The procedure was that several samples of the latexes were taken over a period of time, and these samples were deposited by spin coating (200 r.p.m. for 10 seconds, then 1000 r.p.m. for 10 seconds) onto SIGMAL lenses and dried in an oven at 50° C. to give transparent photochromic films of thickness 3.7 µm.

The films were recovered and the photochromic compounds were extracted with 10 ml of acetonitrile at 80° C. in the presence of a KEMIX n° 16 internal standard. This extraction was carried out for 20 mm. After stirring, the solution was filtered, then analysed by inverse-phase high-pressure liquid-phase chromatography (HPLC). The chromatography was performed on a KROMASIL® C18 column (TOUZART and MATIGNON).

The elution solvent was an acetonitrile/water mixture (80/20) in isocratic elution mode or in gradient mode and the elution speed was 1 ml/minute. The detector used was a WATERS 484 detector at 230 nm.

The yield (%) of photochromic compounds was the ratio of the quantity of photochromic compound found in the film compared to the quantity theoretically expected.

The results of these tests are summarized in Table III below:

TABLE III

| Example N° | Date of analysis | Concentration of photochromic compound (%) |
|---|---|---|
| Comparative A | Mar. 2, 2000 | 6 |
| | Mar. 29, 2000 | 4.08 |
| | May 11, 2000 | 2.5 |
| In form of dried film prepared Feb. 29, 2000 | Mar. 29, 2000 | 6 |
| | May 11, 2000 | 6 |
| 1 | Mar. 29, 2000 | 6 |
| | May 11, 2000 | 5.6 |
| 2 | Mar. 29, 2000 | 6 |
| | May 11, 2000 | 3.3 |
| 3 | Jun. 23, 2000 | 5.3 |
| | Aug. 2, 2000 | 4.8 |
| | Sep. 9, 2000 | 3.3 |
| 4 | Jun. 23, 2000 | 5.4 |
| | Aug. 2, 2000 | 5.4 |
| | Sep. 12, 2000 | 5.4 |
| 5 | Aug. 18, 2000 | 4.1 |
| | Sep. 12, 2000 | 4 |

TABLE III-continued

| Example N° | Date of analysis | Concentration of photochromic compound (%) |
|---|---|---|
| 6 | Nov. 2, 2000 | 5.9 |
| | Dec. 8, 2000 | 5.6 |

The results in Table III show that the concentration of photochromic compound in the latex of comparative example A, which did not contain a photochromic property stabilization agent according to the invention, reduced considerably, from 6 to 2.5% in a little over two months.

It is interesting to note that when the same latex was applied in the form of a film and dried, a substrate coated with the film remained stable over the same period of time (concentration of photochromic compound stable at 6%). This confirms that the degradation of the photochromic compound does indeed occur in the liquid latex.

Examples 1 to 5 clearly show that the addition of an agent according to the invention stabilized the concentration of photochromic compound in the liquid latex over periods of at least two months.

The results also show that the addition of the photochromic property stabilization agent is preferably performed at the beginning of the polymerization, given that this does not alter the polymerization kinetics.

In addition, the cyclohexene agents seemed to lead to longer stabilization periods, since a significant degradation of the photochromic properties appeared after two months with MBOL, which was not the case with cyclohexene.

Finally, cyclohexene has the advantage of not giving any residual colour to the film.

What is claimed is:

1. A method of producing photochromic latex comprising a stabilizing agent comprising:

obtaining an aqueous emulsion of a polymerizable mixture comprising a weight of one or more organic monomers containing C=C groups that are polymerizable by a free-radical mechanism and one or more photochromic compounds;

polymerizing the polymerization mixture to form a latex;

obtaining a composition comprising a weight of least one stabilization agent capable of stabilizing photochromic properties selected from the group consisting of cyclopentene compounds, cyclohexene compounds, cycloheptene compounds, cyclooctene compounds, and compounds comprising an ethylenic unsaturation not forming part of an aromatic ring and a carbon atom bearing a free hydroxy group, wherein the carbon atom is in the α position with respect to the ethylenic unsaturation; and adding the composition comprising the stabilization agent to the polymerization mixture prior to or during polymerization of the polymerizable mixture or to the latex after polymerization;

wherein photochromic latex comprising a stabilizing agent is produced.

2. The method of claim 1, wherein the stabilization agent is a cyclohexene compound.

3. The method of claim 2, wherein the cyclohexene compound has the formula:

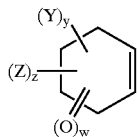

(I)

wherein:
  any Y is, independently, an alkyl group of 1 to 4 carbon atoms;
  any Z is a hydroxy group, a 2-oxoethyl group, a hydroxyalkyl group of 1 to 3 carbon atoms, an alkoxycarbonyl group of 2 to 5 carbon atoms, or a R'COOR" group in which R' is an alkyl radical of 1 to 4 carbon atoms and R" is an alkane di-yl radical of 2 to 4 carbon atoms or an alkylidene radical of 1 to 5 carbon atoms;
  y is an integer from 0 to 3;
  z is 0 or 1;
  w is 0 or 1; and
  the sum of z and w is 0 or 1.

4. The method of claim 3, wherein the cyclohexene compound is selected from the group consisting of cyclohexene, α-terpineol, terpinen-4-ol, α-terpinyl acetate, α-terpinyl propionate, α-terpinyl butyrate, 1-methyl-1-cyclohexene, 3-methyl-1-cyclohexene, 4-methyl-1-cyclohexene, methyl 1-cyclohexene-1-carboxylate, 3-methyl-2-cyclohexen-1-ol, 3-methyl-2-cyclohexen-1-one, 4-isopropyl-2-cyclohexen-1-one, 3,5-dimethyl-2-cyclohexen-1-one, 4,4-dimethyl-2-cyclohexen 1-one, isophorone, 2,6,6-trimethyl-1-cyclohexene-1-acetaldehyde, and 3,5,5-trimethyl-2-cyclohexen-1-ol.

5. The method of claim 3, wherein the cyclohexene compound is cyclohexene.

6. The method of claim 1, wherein the stabilization agent is a compound comprising:
  an ethylenic unsaturation not forming part of an aromatic ring; and,
  a carbon atom bonded to a free hydroxy group and at least one hydrogen atom, wherein the carbon atom is in the α position with respect to the ethylenic unsaturation.

7. The method of claim 6, wherein the stabilization agent has the formula:

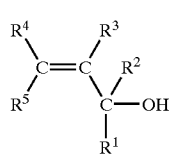

(II)

wherein:
  $R^1$ and $R^2$ are both hydrogen; or one of $R^1$ and $R^2$ is hydrogen and the other forms, with the $R^5$ group, a $C_5$–$C_{10}$ ring, which may be substituted with one or more linear or branched $C_1$–$C_4$ alkyl groups and/or one or more $C_2$–$C_4$ alkylene groups; or one of $R^1$ and $R^2$ is hydrogen and the other is a $C_1$–$C_6$ aliphatic alkyl group, a $C_4$–$C_{16}$ cyclic hydrocarbon group, or a $C_6$–$C_{16}$ aromatic hydrocarbon group;
  $R^3$, $R^4$, and $R^5$, independently, are: hydrogen; a $C_1$–$C_6$ alkyl group which may be substituted with one or more OH groups and may be interrupted by one or more ether, ester or ketone groups; a $C_6$–$C_{16}$ aromatic hydrocarbon group; or a $C_4$–$C_{16}$ cyclic hydrocarbon group;
  $R^3$ and $R^4$ may form a $C_5$–$C_{10}$ ring which may be substituted with one or more $C_1$–$C_4$ alkyl groups or $C_2$–$C_4$ alkylene groups; and
  two or more carbon atoms of any $C_5$–$C_{10}$ ring formed with $R^1$ or $R^2$ and $R^5$ or with $R^3$ and $R^4$ may be bonded by a hydrocarbon bridge.

8. The method of claim 7, wherein $R^1$ and $R^2$ represent hydrogen, $R^3$ represents a methyl group, $R^4$ represents hydrogen or a methyl group and $R^5$ represents hydrogen, a methyl, ethyl or $CH_2OH$ group.

9. The method of claim 7, wherein the compound of formula (II) is selected from the group consisting of allyl alcohol, methallyl alcohol, crotyl alcohol, 2-cyclohexen-1-ol, trans-2-hexen-1-ol, cis-2-butene-1,4-diol, 3-methyl-2-buten-1-ol, trans-2-methyl-3-phenyl-2-propen-1-ol, 3-buten-2-ol, carveol, myrtenol, verbenol and trans-cinnamyl alcohol.

10. The method of claim 9, wherein the compound of formula (II) is 3-methyl-2-buten-1-ol.

11. The method of claim 1, wherein the weight of the at least one stabilization agent is 0.1 to 10% of the weight of the monomers in the polymerizable mixture.

12. The method of claim 11, wherein the weight of the at least one stabilization agent is 1 to 10% of the weight of the monomers in the polymerizable mixture.

13. The method of claim 12, wherein the weight of the at least one stabilization agent is about 5% of the weight of the monomers in the polymerizable mixture.

14. The method of claim 1, wherein the aqueous emulsion of the polymerizable mixture is further defined as a miniemulsion.

15. The method of claim 1, wherein the monomers are selected from the group consisting of alkyl acrylates, alkyl methacrylates, and mixtures thereof.

16. The method of claim 1, wherein the photochromic compound is selected from the group consisting of chromenes, spirooxazines and mixtures thereof.

17. The method of claim 1, wherein the photochemical property stabilization agent is added to the polymerizable mixture during polymerization.

18. The method of claim 1, wherein the photochemical property stabilization agent is added to the latex after polymerization.

19. A stabilized photochromic latex comprising:
  an aqueous dispersion of polymer particles resulting from the free-radical polymerization of one or more organic monomers containing C=C groups;
  one or more photochromic compounds; and;
  an effective quantity of at least one stabilization agent capable of stabilizing photochromic properties selected from the group consisting of cyclopentene compounds, cyclohexene compounds, cycloheptene compounds, cyclooctene compounds, and compounds comprising an ethylenic unsaturation not forming part of an aromatic ring and a carbon atom bearing a free hydroxy group, wherein the carbon atom is in the α position with respect to the ethylenic unsaturation.

20. The latex of claim 19, wherein the stabilization agent is a cyclohexene compound.

21. The latex of claim 20, wherein the cyclohexene compound has the formula:

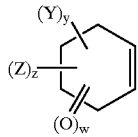

(I)

wherein:
any Y is, independently, an alkyl group of 1 to 4 carbon atoms;
any Z is a hydroxy group, a 2-oxoethyl group, a hydroxyalkyl group of 1 to 3 carbon atoms, an alkoxycarbonyl group of 2 to 5 carbon atoms, or a R'COOR" group in which R' is an alkyl radical of 1 to 4 carbon atoms and R" is an alkane di-yl radical of 2 to 4 carbon atoms or an alkylidene radical of 1 to 5 carbon atoms;
y is an integer from 0 to 3;
z is 0 or 1;
w is 0 or 1; and
the sum of z and w is 0 or 1.

22. The latex of claim 21, wherein the cyclohexene compound is selected from the group consisting of cyclohexene, α-terpineol, terpinen-4-ol, α-terpinyl acetate, α-terpinyl propionate, α-terpinyl butyrate, 1-methyl-1-cyclohexene, 3-methyl-1-cyclohexene, 4-methyl-1-cyclohexene, methyl 1-cyclohexene-1-carboxylate, 3-methyl-2-cyclohexen-1-ol, 3-methyl-2-cyclohexen-1-one, 4-isopropyl-2-cyclohexen-1-one, 3,5-dimethyl-2-cyclohexen-1-one, 4,4-dimethyl-2-cyclohexen-1-one, isophorone, 2,6,6-trimethyl-1-cyclohexene-1-acetaldehyde, and 3,5,5-trimethyl-2-cyclohexen-1-ol.

23. The latex of claim 21, wherein the cyclohexene compound is cyclohexene.

24. The latex of claim 20, wherein the stabilization agent is a compound comprising:
an ethylenic unsaturation not forming part of an aromatic ring; and
a carbon atom bonded to a free hydroxy group and at least one hydrogen atom, wherein the carbon atom is in the a position with respect to the ethylenic unsaturation.

25. The latex of claim 20, wherein the compounds with ethylenic unsaturation have the formula:

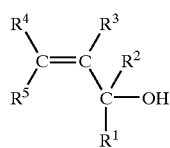

(II)

wherein:
$R^1$ and $R^2$ are both hydrogen; or one of $R^1$ and $R^2$ is hydrogen and the other forms, with the $R^5$ group, a $C_5$–$C_{10}$ ring, which may be substituted with one or more linear or branched $C_1$–$C_4$ alkyl groups and/or one or more $C_2$–$C_4$ alkylene groups; or one of $R^1$ and $R^2$ is hydrogen and the other is a $C_1$–$C_6$ aliphatic alkyl group, a $C_4$–$C_{16}$ cyclic hydrocarbon group, or a $C_6$–$C_{16}$ aromatic hydrocarbon group;
$R^3$, $R^4$, and $R^5$, independently, are: hydrogen; a $C_1$–$C_6$ alkyl group which may be substituted with one or more OH groups and may be interrupted by one or more ether, ester or ketone groups; a $C_6$–$C_{16}$ aromatic hydrocarbon group; or a $C_4$–$C_{16}$ cyclic hydrocarbon group; and
$R^3$ and $R^4$ may form a $C_5$–$C_{10}$ ring which may be substituted with one or more $C_1$–$C_4$ alkyl groups or $C_2$–$C_4$ alkylene groups; and
two or more carbon atoms of any $C_5$–$C_{10}$ ring formed with $R^1$ or $R^2$ and $R^5$ or with $R^3$ and $R^4$ may be bonded by a hydrocarbon bridge.

26. The latex of claim 25, wherein $R^1$ and $R^2$ represent hydrogen, $R^3$ represents a methyl group, $R^4$ represents hydrogen or a methyl group and $R^5$ represents hydrogen, a methyl, ethyl or CH$_2$OH group.

27. The latex of claim 25, wherein the compound of formula (II) is selected from the group consisting of allyl alcohol, methallyl alcohol, crotyl alcohol, 2-cyclohexen-1-ol, trans-2-hexen-1-ol, cis-2-butene-1,4-diol, 3-methyl-2-buten-1-ol, trans-2-methyl-3-phenyl-2-propen-1-ol, 3-buten-2-ol, carveol, myrtenol, verbenol and trans-cinnamyl alcohol.

28. The latex of claim 27, wherein the compound of formula (II) is 3-methyl-2-buten-1-ol.

29. The latex of claim 19, further defined as comprising 0.1 to 10% by weight stabilization agent with respect to the weight of monomers in the initial mixture.

30. The latex of claim 29, further defined as comprising 1 to 10% by weight stabilization agent with respect to the weight of monomers in the initial mixture.

31. The latex of claim 30, further defined as comprising about 5% by weight stabilization agent with respect to the weight of monomers in the initial mixture.

32. The latex of claim 19, wherein the polymer is an alkyl polyacrylate, an alkyl polymethacrylate, or a copolymer of alkyl acrylate and alkyl methacrylate.

33. The latex of claim 19, wherein the photochromic compound is selected from the group consisting of chromenes, spirooxazines, and mixtures thereof.

34. A substrate coated with a film formed by drying a stabilized photochromic latex comprising:
an aqueous dispersion of polymer particles resulting from the free-radical polymerization of one or more organic monomers containing C=C groups;
one or more photochromic compounds; and;
an effective quantity of at least one stabilization agent capable of stabilizing photochromic properties selected from the group consisting of cyclopentene compounds, cyclohexene compounds, cycloheptene compounds, cyclooctene compounds, and compounds comprising an ethylenic unsaturation not forming part of an aromatic ring and a carbon atom bearing a free hydroxy group, wherein the carbon atom is in the α position with respect to the ethylenic unsaturation.

35. The substrate of claim 34, further defined as an ophthalmic lens.

* * * * *

UNITED STATES PATENT AND TRADEMARK OFFICE
CERTIFICATE OF CORRECTION

PATENT NO. : 6,740,699 B2
DATED : May 25, 2004
INVENTOR(S) : Tardieu et al.

It is certified that error appears in the above-identified patent and that said Letters Patent is hereby corrected as shown below:

Column 11,
Line 34, please delete "4,4-dimethyl-2-cyclohexen 1-one" and insert -- 4,4-dimethyl-2-cyclohexen-1-one --.

Column 12,
Line 57, please delete "and;" and insert -- and --.

Column 13,
Line 47, please delete "a position" and insert -- α position --.

Column 14,
Line 50, please delete "and;" and insert -- and --.

Signed and Sealed this

Sixteenth Day of November, 2004

JON W. DUDAS
*Director of the United States Patent and Trademark Office*